United States Patent
Yamada

(10) Patent No.: US 7,035,675 B2
(45) Date of Patent: Apr. 25, 2006

(54) METHOD FOR STORING AND REPRODUCING RING TONE MELODIES OF MOBILE PHONES AND SYSTEM THEREOF

(75) Inventor: Tsutomu Yamada, Tokyo (JP)

(73) Assignee: NEC Corporation, (JP)

( * ) Notice: Subject to any disclaimer, the term of this patent is extended or adjusted under 35 U.S.C. 154(b) by 122 days.

(21) Appl. No.: 10/691,652

(22) Filed: Oct. 24, 2003

(65) Prior Publication Data

US 2004/0092295 A1    May 13, 2004

(30) Foreign Application Priority Data

Oct. 30, 2002    (JP)    ............. 2002-315734

(51) Int. Cl.
*H04B 1/38* (2006.01)
*H04M 1/00* (2006.01)

(52) U.S. Cl. ............. 455/567; 379/373.01; 379/373.02
(58) Field of Classification Search ................ 455/567; 379/373.01, 373.02
See application file for complete search history.

(56) References Cited

U.S. PATENT DOCUMENTS

| | | | | |
|---|---|---|---|---|
| 6,094,587 | A * | 7/2000 | Armanto et al. | ............. 455/567 |
| 6,366,791 | B1 * | 4/2002 | Lin et al. | ..................... 455/567 |
| 6,816,703 | B1 * | 11/2004 | Wood et al. | ............... 455/3.04 |
| 2002/0010740 | A1 * | 1/2002 | Kikuchi et al. | ............. 709/203 |
| 2002/0049509 | A1 * | 4/2002 | Sueyoshi et al. | ............. 700/94 |
| 2003/0003968 | A1 * | 1/2003 | Muraki | ....................... 455/567 |

FOREIGN PATENT DOCUMENTS

| | | |
|---|---|---|
| DE | 199 62 388 A1 | 6/2001 |
| JP | 09-016168 | 1/1997 |
| JP | 2001-195068 | 7/2001 |
| JP | 2001-331182 | 11/2001 |
| JP | 2002-082675 | 3/2002 |
| JP | 2002-091437 | 3/2002 |
| JP | 2002-135420 | 5/2002 |
| WO | WO-98/25397 | 6/1998 |

OTHER PUBLICATIONS

European Search Report issued Mar. 30, 2004.

* cited by examiner

*Primary Examiner*—Curtis Kuntz
*Assistant Examiner*—Tuan Pham
(74) *Attorney, Agent, or Firm*—Dickstein, Shapiro, Morin & Oshinsky, LLP.

(57) ABSTRACT

A server for storing data of a ring tone melody downloaded from a ring tone melody distribution server through a network is disposed. A mobile phone has a memory for storing only one ring tone melody. When there is necessity for the mobile phone to reproduce the ring tone melody, the necessity including occurrence of an incoming call, the mobile phone is connected to the server so as to download the data of the ring tone melody therefrom. Alternatively, a memory of data for a part of a ring tone melody may be disposed in the mobile phone so that the part of the ring tone melody can be reproduced until the rest of the ring tone melody is completely downloaded.

5 Claims, 4 Drawing Sheets

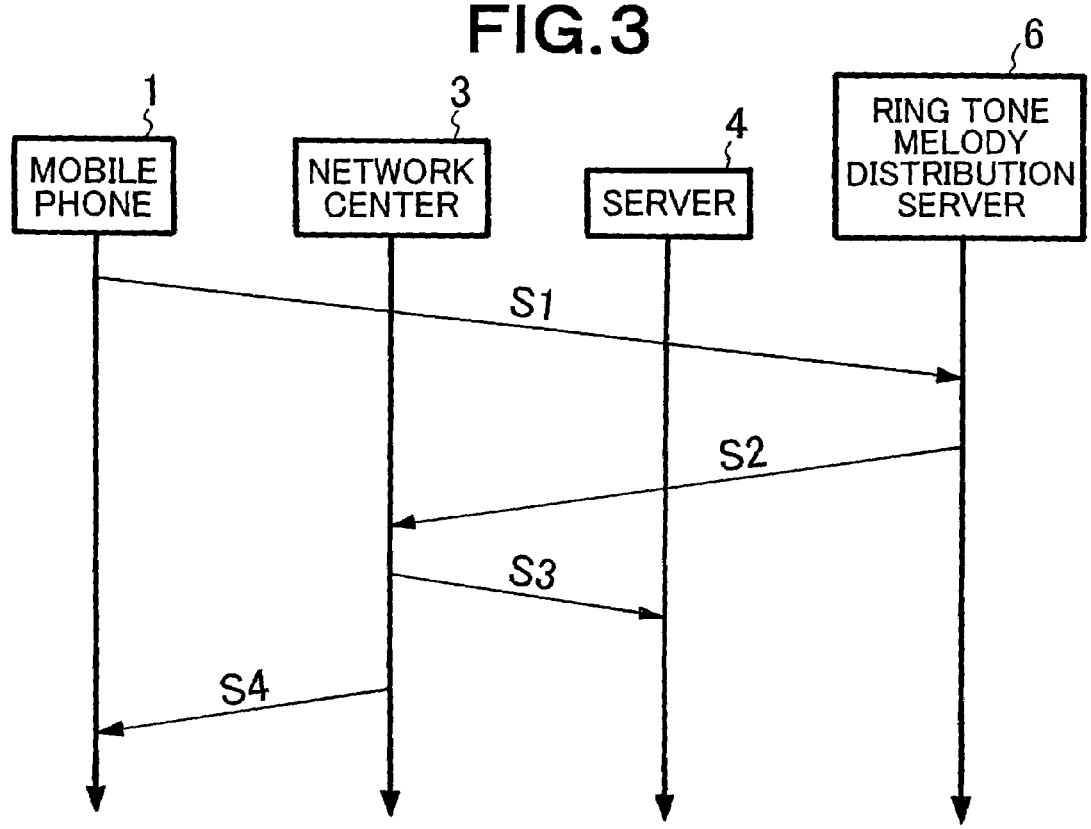
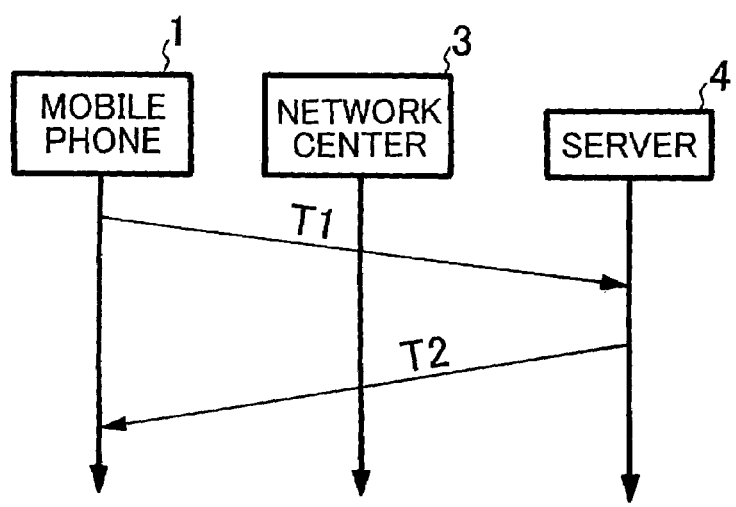

METHOD FOR STORING AND REPRODUCING RING TONE MELODIES OF MOBILE PHONES AND SYSTEM THEREOF

BACKGROUND OF THE INVENTION

1. Field of the Invention

The present invention relates to a ring tone melody service for use with mobile phones.

2. Description of the Related Art

In recent years, mobile phones have been used as information terminal units having a function for connecting themselves to the Internet along with their original function as telephone units. As a service using the Internet, a ring tone melody distribution service has become popular. The ring tone melody distribution service allows the user to connect his or her mobile phone to a ring tone melody distribution site through the Internet and to download his or her desired ring tone melody from the site.

Normally, the user is charged for data of a ring tone melody downloaded from the ring tone melody distribution site. In addition, the storage capacity of a built-in memory of a mobile phone is not large. Thus, the user who bought many ring tone melodies should discard many of them that cannot be stored in the mobile phone. As a result, the user's expenditure will become wasteful.

To solve such a problem, a technology for compressing data of a ring tone melody and storing the compressed data has been proposed (refer to for example patent related art reference 1). In addition, a technology for storing uncompressed data of a part of a ring tone melody and reproducing it during decompressing the rest thereof has been proposed (refer to for example patent related art reference 2).

Patent Related Art Reference 1

Japanese Patent Publication No. HEI 9-16168 A

Patent Related Art Reference 2

Japanese Patent Publication No. 2002-91437 A

However, even if data is compressed, it is stored in the built-in memory of the mobile phone. Thus, when many ring tone melodies are stored or when the file sizes thereof will become large as the ring tone melody distribution service will advance, such technologies are not capable of solving the problem.

SUMMARY OF THE INVENTION

Therefore, an object of the present invention is to provide a method for storing data of a ring tone melody to the outside of a mobile phone, receiving the data of the ring tone melody therefrom upon occurrence of an incoming call, and reproducing the received ring tone melody without need to increase the storage capacity of the mobile phone.

To accomplish the foregoing object, the present invention is a method for storing data of a ring tone melody downloaded from a ring tone melody distribution server in a mobile phone through a network and reproducing the stored data, comprising the steps of storing the data of the ring tone melody downloaded from the ring tone melody distribution server to the mobile phone in a ring tone melody storing server, and connecting the mobile phone to the ring tone melody storing server, receiving the data of the ring tone melody which has been downloaded from the ring tone melody distribution server, temporarily storing the received data in the mobile phone, and causing the mobile phone to reproduce the stored data when there is necessity for the mobile phone to reproduce the ring tone melody, the necessity including occurrence of an incoming call.

The present invention may be the method further comprising the steps of storing data of a part of a ring tone melody downloaded from the ring tone melody distribution server in the mobile phone, and reproducing data of the part of the ring tone melody until the data of the ring tone melody is completely received from the ring tone melody storing server through a mobile phone line when there is necessity for the mobile phone to reproduce the ring tone melody, the necessity including occurrence of an incoming call.

These and other objects, features and advantages of the present invention will become more apparent in light of the following detailed description of preferred embodiments thereof, as illustrated in the accompanying drawings.

BRIEF DESCRIPTION OF DRAWINGS

FIG. 3 is a schematic diagram showing a flow of a process for downloading data of a ring tone melody from a ring tone melody distribution server and storing the downloaded data of the ring tone melody to a server;

FIG. 4 is a schematic diagram showing a flow of a process for reproducing stored data of a ring tone melody.

DESCRIPTION OF PREFERRED EMBODIMENTS

First Embodiment

Next, with reference to the accompanying drawings, a first embodiment of the present invention will be described.

Figure 1:
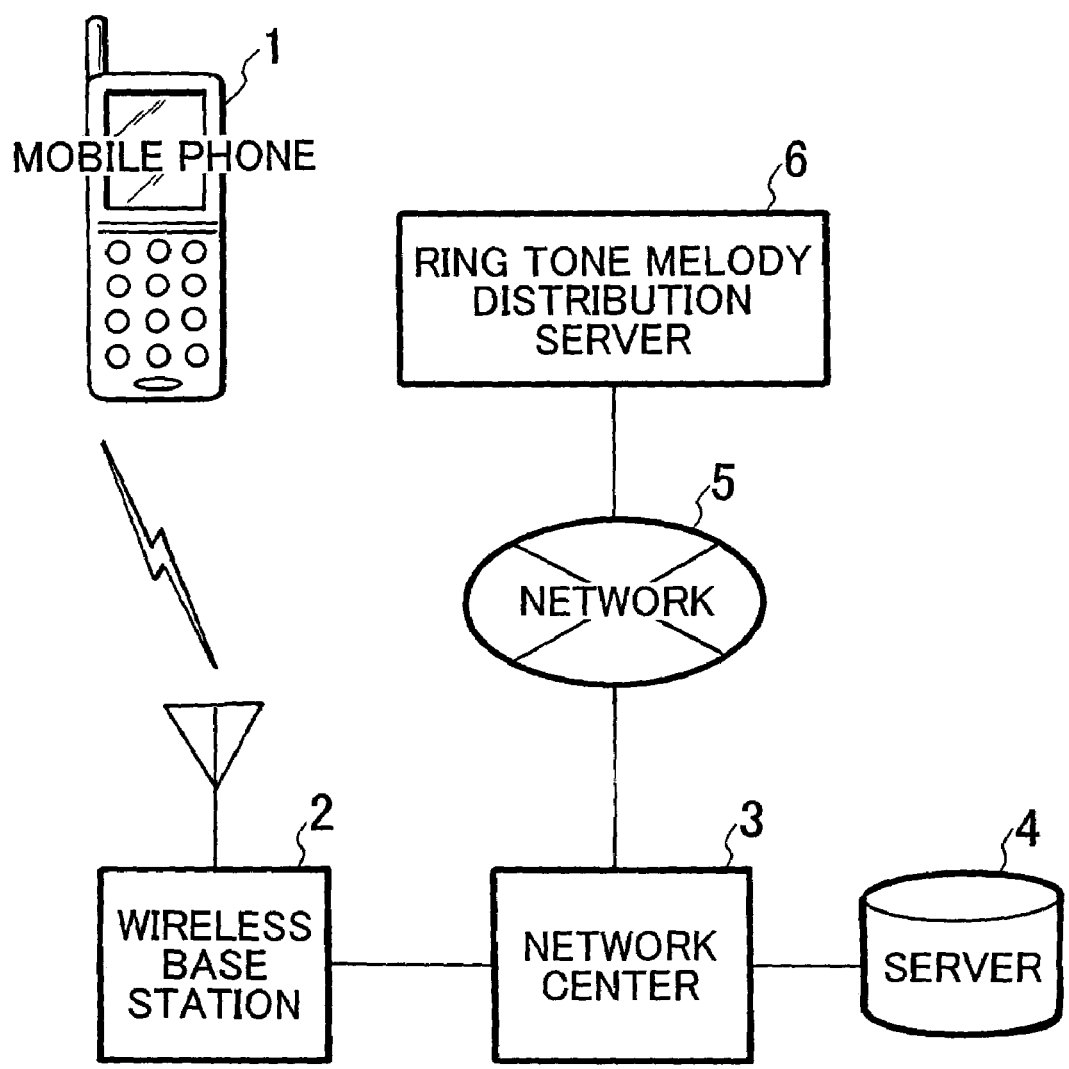
FIG. 1 is a schematic diagram showing a structure of a ring tone melody storing and reproducing system according to a first embodiment of the present invention.

With reference to FIG. 1, a ring tone melody storing and reproducing system according to the first embodiment of the present invention comprises a mobile phone 1, a wireless base station 2, a network center 3, and a server 4. The network center 3 is connected to a ring tone melody distribution server 6 through a network 5.

The wireless base station 2 is wirelessly connected to the mobile phone 1. The wireless base station 2 has a function for connecting the mobile phone 1 and the network center 3.

The network center 3 is disposed among the wireless base station 2, the server 4, and the network 5. The network center 3 has a function for controlling a flow of data.

The server 4 is directly connected to the network center 3. The server 4 stores data of a ring tone melody downloaded from the ring tone melody distribution server 6 through the network 5. The server 4 transmits the data of the ring tone melody to the mobile phone 1 through the wireless base station 2 and the network center 3. The server 4 comprises a hard disk, a semiconductor memory, or the like. The server 4 has a function of a storing means.

The network 5 has a structure of a conventional network. The network 5 is for example the Internet.

The ring tone melody distribution server 6 stores data of many ring tone melodies. The ring tone melody distribution server 6 has a function for distributing data of ring tone melodies through the network 5.

Figure 2:
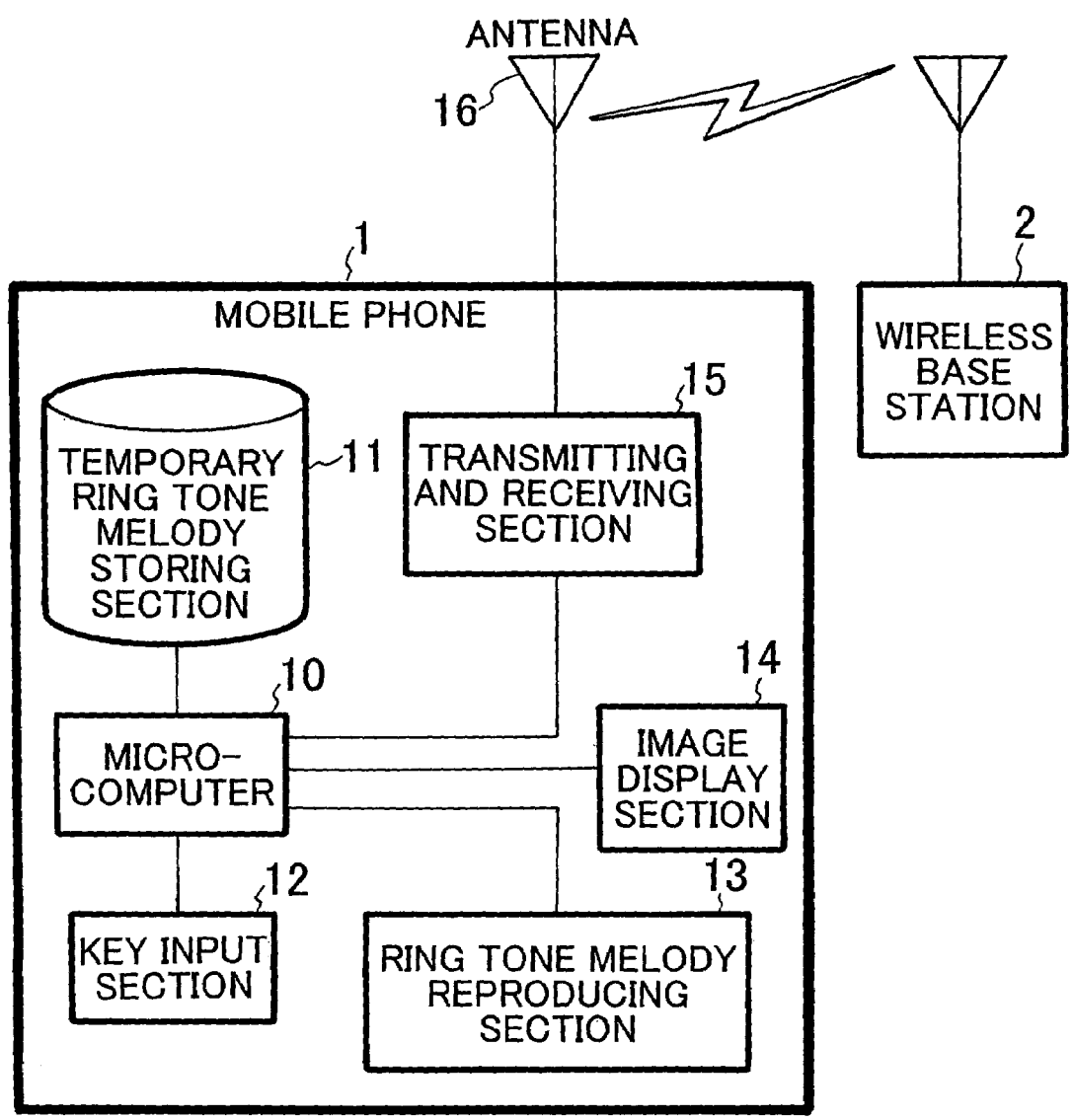
FIG. 2 is a schematic diagram showing a structure of a mobile phone according to the first embodiment of the present invention.

With reference to FIG. 2, the mobile phone 1 comprises a microcomputer 10, a temporary ring tone melody storing section 11, a key input section 12, a ring tone melody reproducing section 13, an image display section 14, a transmitting and receiving section 15, and an antenna 16.

The temporary ring tone melody storing section 11, the key input section 12, the ring tone melody reproducing section 13, the image display section 14, and the transmitting and receiving section 15 are connected to the microcomputer 10. The microcomputer 10 receives user's input from the key input section 12 and performs various controls according to the user's input. In other words, the microcomputer 10 performs input and output controls of data of a ring tone melody of the temporary ring tone melody storing section 11, a control of the reproduction of a ring tone melody of the ring tone melody reproducing section 13, a control of the display of the image display section 14, and a control of data transmission and reception of the transmitting and receiving section 15.

The temporary ring tone melody storing section 11 is connected to the microcomputer 10. The temporary ring tone melody storing section 11 inputs and outputs data of a ring tone melody under the control of the microcomputer 10. The temporary ring tone melody storing section 11 temporarily stores data of a ring tone melody received from the server 4 so that the ring tone melody is reproduced. The temporary ring tone melody storing section 11 needs to have a storage capacity of data for at least one ring tone melody. The temporary ring tone melody storing section 11 is composed of for example a semiconductor memory or a hard disk.

The key input section 12 is connected to the microcomputer 10. When for example user wants to download data of a ring tone melody from the ring tone melody distribution server 6, the key input section 12 sends user's command to the microcomputer 10. The key input section 12 is for example a push button type or rotatable dial type.

The ring tone melody reproducing section 13 is connected to the microcomputer 10. The ring tone melody reproducing section 13 receives data of a ring tone melody from the microcomputer 10 and reproduces the ring tone melody. The ring tone melody reproducing section 13 comprises for example an amplifier and a small speaker. Alternatively, the ring tone melody reproducing section 13 may also have an output terminal that is connected to an external amplifier and an external speaker so as to output a sound therefrom.

The image display section 14 is connected to the microcomputer 10. The image display section 14 displays data including image data received from the microcomputer 10. The image display section 14 is for example a monochrome or color liquid crystal display.

The transmitting and receiving section 15 is connected to the microcomputer 10 and the antenna 16. The transmitting and receiving section 15 transmits and receives data of a ring tone melody under the control of the microcomputer 10.

The antenna 16 transmits as a radio wave a signal received from the transmitting and receiving section 15, converts a received radio wave into a signal, and sends the converted signal to the transmitting and receiving section 15. The antenna 16 wirelessly connects the mobile phone 1 to the nearest wireless base station 2 and transmits and receives the radio wave to and from the wireless base station 2.

Next, with reference to FIG. 3, a flow of a process for downloading data of a ring tone melody from the ring tone melody distribution server 6 and storing the downloaded data to the server 4 will be described. In FIG. 3, vertical arrows represent elapse of time, whereas inclined arrows represent flows of data among the mobile phone 1, the network center 3, the server 4, and the ring tone melody distribution server 6.

When the mobile phone 1 receives a ring tone melody distribution request from the user through the key input section 12 at step S1, the microcomputer 10 performs a process for connecting the mobile phone 1 to the nearest wireless base station 2 through the transmitting and receiving section 15. Thereafter, the wireless base station 2 connects the mobile phone 1 to the ring tone melody distribution server 6 through the network center 3 and the network 5. When they are connected, the mobile phone 1 requests the ring tone melody distribution server 6 to distribute a ring tone melody to the mobile phone 1.

At step S2, the ring tone melody distribution server 6 transmits a ring tone melody to the network center 3 through the network 5 according to the distribution request from the mobile phone 1.

At step S3, the network center 3 transmits the ring tone melody received from the ring tone melody distribution server 6 to the server 4. The server 4 stores the ring tone melody.

At step S4, the network center 3 notifies the mobile phone 1 that the data of the ring tone melody has been downloaded to the server 4.

Next, with reference to FIG. 4, a flow of a process for reproducing a ring tone melody stored in the server 4 will be described.

When the user requests the mobile phone 1 to reproduce a ring tone melody through the key input section 12 at step T1 or when the mobile phone 1 needs to reproduce a ring tone melody upon occurrence of an incoming call, the microcomputer 10 performs a process for connecting the mobile phone 1 to the nearest wireless base station 2 through the transmitting and receiving section 15. Thereafter, the wireless base station 2 connects the mobile phone 1 to the server 4 through the network center 3. When they are connected, the mobile phone 1 requests the server 4 to download data of a ring tone melody to itself.

At step T2, receiving the download request from the mobile phone 1, the server 4 transmits the data of the ring tone melody to the mobile phone 1 through the network center 3. Next, the mobile phone 1 receives the ring tone melody from the network center 3. The microcomputer 10 stores the data of the ring tone melody to the temporary ring tone melody storing section 11. Finally, the microcomputer 10 sends the data stored in the temporary ring tone melody storing section 11 to the ring tone melody reproducing section 13 so as to reproduce the ring tone melody.

Second Embodiment

Figure 5:
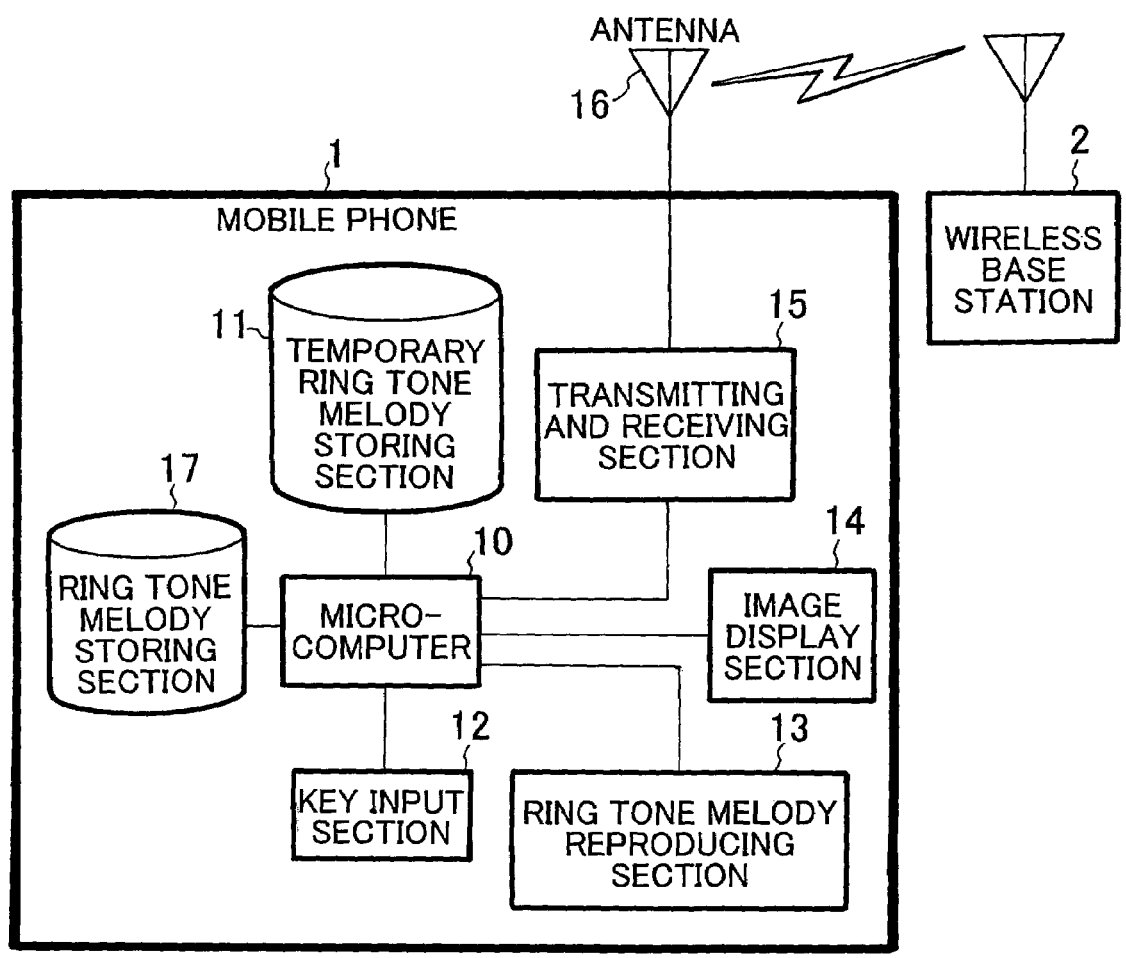
FIG. 5 is a schematic diagram showing a structure of a mobile phone according to a second embodiment of the present invention.

FIG. 5 shows a mobile phone 1 according to a second embodiment of the present invention. A ring tone melody storing section 17 that is newly added to the structure of the first embodiment shown in FIG. 2 is connected to a microcomputer 10. The ring tone melody storing section 17 has stored data of a part of a ring tone melody. The ring tone melody storing section 17 is composed of for example a semiconductor memory or a hard disk. The ring tone melody storing section 17 has a function as a storing means.

When a ring tone melody is reproduced upon occurrence of an incoming call, the mobile phone 1 shown in FIG. 2 cannot play a ring tone melody until the ring tone melody is completely downloaded from the server 4. However, according to the second embodiment, while data of a ring tone melody is downloaded from the server 4, a part of a ring tone melody stored in the ring tone melody storing section 17 can be reproduced. When the ring tone melody has been completely downloaded, the ring tone melody stored in the temporary ring tone melody storing section 11 is reproduced.

According to the present invention, as was described above, data of a ring tone melody is stored in a server rather than a mobile phone. Only when a ring tone melody is reproduced, the data of the ring tone melody is temporarily stored in the mobile phone. As a result, not only many ring tone melodies can be stored and selectively reproduced, but ring tone melodies whose file sizes become large according to an advanced ring tone melody service can be easily handled.

In addition, since only data corresponding to a part of a ring tone melody is stored in a mobile phone, while data of the rest of the ring tone melody is received from the server, the part of ring tone melody can be reproduced.

Although the present invention has been shown and described with respect to the preferred embodiments thereof, it should be understood by those skilled in the art that the foregoing and various other changes, omissions, and additions in the form and detail thereof may be made therein without departing from the spirit and scope of the present invention.

What is claimed is:

1. A method of storing data of a ring tone melody downloaded from a ring tone melody distribution server in a mobile phone through a network and reproducing the stored data, comprising the steps of:
    storing the data of the ring tone melody downloaded from the ring tone melody distribution server in a ring tone melody storing server by the mobile phone;
    connecting the mobile phone to the ring tone melody storing server through a mobile phone line, receiving the data of the ring tone melody which has been downloaded from the ring tone melody distribution server, temporarily storing the received data in the mobile phone, and causing the mobile phone to reproduce the stored data, in a case when there is a necessity for the mobile phone to reproduce the ring tone melody, the necessity including an occurrence of an incoming call;
    storing, in the mobile phone, data of a part of a ring tone melody to be downloaded from the ring tone melody distribution server; and
    when the incoming call is received, reproducing data of the stored part of the ring tone melody to be downloaded until the data of the ring tone melody to be downloaded is completely received from the ring tone melody storing server through a mobile phone line.

2. A system for storing data of a ring tone melody downloaded from a ring tone melody distribution server in a mobile phone through a network and reproducing the stored data, comprising:
    a ring tone melody storing server for storing the data of the ring tone melody downloaded from the ring tone melody distribution server;
    a mobile phone connectable to the ring tone melody storing server through a mobile phone line, the mobile phone being operative to: receive the data of the ring tone melody downloaded from the ring tone melody distribution server from the ring tone melody storing server, store the data of the ring tone melody in an internal temporary storing means, and reproduce the ring tone melody, in a case when there is a necessity for the mobile phone to reproduce the ring tone melody, the necessity including an occurrence of an incoming call,
    the mobile phone further comprising means for storing data of a part of the ring tone melody to be downloaded, and means for when the incoming call is received, reproducing data of the stored part of the ring tone melody to be downloaded until the data of the ring tone melody to be downloaded is completely received from the ring tone melody storing server.

3. The system as set forth in claim 2,
    wherein the temporary storing means has a storage capacity of data for one ring tone melody.

4. A mobile phone connectable to a ring tone melody storing server through a mobile phone line, a ring tone melody having been stored in the ring tone melody storing server, the mobile phone being operable to:
    receive from the ring tone melody storing server the data of the ring tone melody downloaded from a ring tone melody distribution server for distributing a ring tone melody through a network,
    temporarily store the data of the ring tone melody in internal temporarily storing means,
    reproduce the ring tone melody, in a case when there is a necessity for the mobile phone to reproduce the ring tone melody, the necessity including an occurrence of an incoming call,
    store data of a part of a ring tone melody to be downloaded, and
    when the incoming call is received, reproduce data of the stored part of the ring tone melody to be downloaded until the data of the ring tone melody to be downloaded is completely received from the ring tone melody storing server.

5. The mobile phone as set forth in claim 4,
    wherein the temporary storing means has a storage capacity of data for one ring tone melody.

* * * * *